(12) United States Patent
Tseng et al.

(10) Patent No.: US 9,618,354 B2
(45) Date of Patent: Apr. 11, 2017

(54) NAVIGATION METHODS AND DEVICES USING USER-SPECIFIC LANDMARK TYPES

(75) Inventors: Philip Tseng, Taipei (TW); William Brian Lathrop, San Jose, CA (US); Jo Ann Sison, Redwood City, CA (US); Crystal Juarez, San Jose, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 559 days.

(21) Appl. No.: 13/547,715

(22) Filed: Jul. 12, 2012

(65) Prior Publication Data
US 2013/0166197 A1    Jun. 27, 2013

Related U.S. Application Data

(60) Provisional application No. 61/579,829, filed on Dec. 23, 2011.

(51) Int. Cl.
  *G01C 21/34* (2006.01)
  *G01C 21/36* (2006.01)

(52) U.S. Cl.
  CPC ..... *G01C 21/3644* (2013.01); *G01C 21/3484* (2013.01); *G01C 21/3641* (2013.01); *G01C 21/3476* (2013.01)

(58) Field of Classification Search
  USPC .......................... 701/70; 303/155, 191, 114.3
  See application file for complete search history.

(56) References Cited

U.S. PATENT DOCUMENTS

| 6,078,865 | A | 6/2000 | Koyanagi |
| 6,484,094 | B1 * | 11/2002 | Wako ................. G01C 21/3617 340/988 |
| 6,707,421 | B1 * | 3/2004 | Drury et al. ............. 342/357.31 |
| 7,480,567 | B2 * | 1/2009 | Suomela et al. ............... 701/428 |
| 7,783,421 | B2 | 8/2010 | Arai et al. |
| 8,688,367 | B2 * | 4/2014 | Mauderer ...................... 701/409 |
| 8,700,302 | B2 * | 4/2014 | Khosravy et al. ............ 701/426 |
| 8,990,008 | B2 * | 3/2015 | Voßen et al. .................. 701/410 |
| 2002/0183924 | A1 * | 12/2002 | Yokota .......................... 701/209 |
| 2007/0078596 | A1 * | 4/2007 | Grace ........................... 701/209 |
| 2008/0125968 | A1 * | 5/2008 | Bradicich et al. ............ 701/211 |
| 2008/0319659 | A1 * | 12/2008 | Horvitz et al. ............... 701/211 |
| 2009/0319176 | A1 * | 12/2009 | Kudoh et al. ................. 701/207 |
| 2010/0077359 | A1 * | 3/2010 | Shinawaki .................... 715/846 |
| 2011/0130956 | A1 * | 6/2011 | Tracton et al. ............... 701/201 |

(Continued)

FOREIGN PATENT DOCUMENTS

| EP | 1 876 418 | 1/2008 |
| EP | 2 141 610 | 1/2010 |

OTHER PUBLICATIONS

European Search Report and Search Opinion, dated Jun. 23, 2016, issued in corresponding European Application No. 12 008 443.9 (7 pages).

*Primary Examiner* — Fadey Jabr
*Assistant Examiner* — Kevin P Mahne
(74) *Attorney, Agent, or Firm* — Andrews Kurth Kenyon LLP

(57) ABSTRACT

A method includes: providing a map database; providing a landmark database; providing at least one user-specific landmark type; determining navigation instructions based on the map database, the landmark database, and the at least one user-specific landmark type; and outputting the determined navigation instructions.

13 Claims, 4 Drawing Sheets

(56) References Cited

U.S. PATENT DOCUMENTS

| | | | |
|---|---|---|---|
| 2011/0172908 A1* | 7/2011 | Singh | 701/201 |
| 2011/0224864 A1* | 9/2011 | Gellatly et al. | 701/30 |
| 2012/0259706 A1* | 10/2012 | Lobaza et al. | 705/14.62 |
| 2014/0108161 A1* | 4/2014 | Cubillo | G01C 21/3644 |
| | | | 705/14.71 |

* cited by examiner

NAVIGATION METHODS AND DEVICES USING USER-SPECIFIC LANDMARK TYPES

CROSS-REFERENCE TO RELATED APPLICATIONS

The present application claims the benefit of U.S. Provisional Patent Application No. 61/579,829, filed on Dec. 23, 2011, which is expressly incorporated herein in its entirety by reference thereto.

FIELD OF THE INVENTION

The present application relates to navigation systems and methods.

BACKGROUND INFORMATION

Navigation systems, which guide a user to a destination, have gained popularity and accessibility in the past decade. In particular, many vehicles, such as cars, are nowadays delivered with navigation systems already installed, and also portable navigation systems (which also may, e.g., be applications running on smartphones) are increasingly popular, which may be used both in vehicles and outside vehicles, for example, for pedestrian navigation. Corresponding navigation systems are described, for example, in U.S. Pat. No. 7,783,421, European Published Patent Application No. 2 141 610, and European Published Patent Application No. 1 876 418.

Such navigation systems output navigation instructions to a user in visual and/or auditory form to guide a user to a selected destination. Conventionally, for example, auditory instructions use distance information, such as "turn right in 200 meters." Additionally, visual information may be displayed, e.g., showing the surroundings of the user on a display, and the above-mentioned distance information may also be given in written form on such a display.

However, such navigation instructions based on distance may in some circumstances be ambiguous to a driver of a vehicle because estimating distances is not always easy, especially under high speed, high traffic, and/or high workload situations. In particular, in urban areas, for example, streets may come frequently, such that a distance to turn information may become difficult to process and interpret.

Therefore, it is possible to additionally or alternatively use landmarks for navigation instructions, for example "turn right at coffee shop XXX," where XXX for example identifies a particular chain, e.g., having a specific brand or trademark, of coffee shops. However, such landmarks may not be equally recognizable by everyone. For example, a person may be unfamiliar with coffee shops of a particular chain and not recognize them, making navigation again difficult.

Therefore, a need is believed to exist for continuous improvement of navigation systems and methods, in particular, to provide navigation instructions to users which are easier to understand and follow.

SUMMARY

According to example embodiments of the present invention, a method is provided, which includes: providing a map database; providing a landmark database; providing at least one user-specific landmark type; determining navigation instructions based on the map database, the landmark database, and the at least one user-specific landmark type; and outputting the determined navigation instructions.

It should be noted that the map database and the landmark database do not have to be implemented separately from each other, but they also may be implemented in a common database.

Through the use of user-specific landmark types, e.g., landmark types which are valid for a specific user, e.g., a driver, the navigation instructions may be tailored to a specific user by using landmarks of the at least user-specific landmark type.

The method may include identifying at least one landmark in a vicinity of a location needing navigation instruction, checking if at least one landmark of the at least one identified landmark matches a landmark type of the at least one user-specific landmark type, and, if yes, determining the navigation instructions may include determining the navigation instructions such that they include a reference to this landmark of a user-specific landmark type.

The at least one user-specific landmark type may include a plurality of user-specific landmark types, wherein each of the user-specific landmark types has a score assigned thereto. In case more than one landmark matching one of the plurality of user-specific landmark types is identified, e.g., a landmark of a user-specific landmark type having the highest score may be used. In case more than one landmark obtains the same score or approximately the same score in this manner, the decision which landmark to use may be based, e.g., on a proximity of the landmark to the location needing navigation instructions.

The location needing navigation instructions may, for example, be a location where a turn has to be performed or where a specific lane has to be chosen.

The providing of at least one user-specific landmark type may be performed based on a user input directly inputting user-specific landmark types. Additionally or alternatively, providing at least one user-specific landmark type may include analyzing movement behavior of the user, for example, movement behavior of a vehicle. For example, if a specific type of landmark is frequently the destination of a drive, this type of landmark may be identified as a user-specific landmark type, for example, when it has been the destination more than a predetermined number of times. The number of times a specific landmark type has been the destination of the user may be used as the above-mentioned score.

According to example embodiments of the present invention, a navigation system is provided, which includes: a storage device including a map database and a landmark database; a processing unit configured to determine navigation instructions based on the map database, the landmark database, and at least one user-specific landmark type; and an output device configured to output the determined navigation instructions.

The at least one user-specific landmark type may be stored in the storage device. The at least one user-specific landmark type may be received from a mobile device, such as a smartphone.

The output device may include, for example, a display and/or a loudspeaker.

The above-mentioned example embodiments may be combined with each other unless specifically noted otherwise. For example, the above-mentioned navigation system may be configured to implement any of the methods described herein. On the other hand, the summary is provided merely to give a short overview over some example embodiments, and other example embodiments may include different features than the ones mentioned above, for example, less features.

Further features and aspects of example embodiments of the present invention are described in further detail below with reference to the appended Figures.

DETAILED DESCRIPTION

In the following, example embodiments of the present invention will be described in greater detail. It should be noted that features from different example embodiments may be combined with each other unless noted specifically to the contrary. On the other hand, a description of an example embodiment with a plurality of features is not to be considered as indicating that all these features are necessary, as other example embodiments may include less features and/or alternative features. Generally, the described example embodiments are not to be considered as limiting in any manner.

Figure 1:
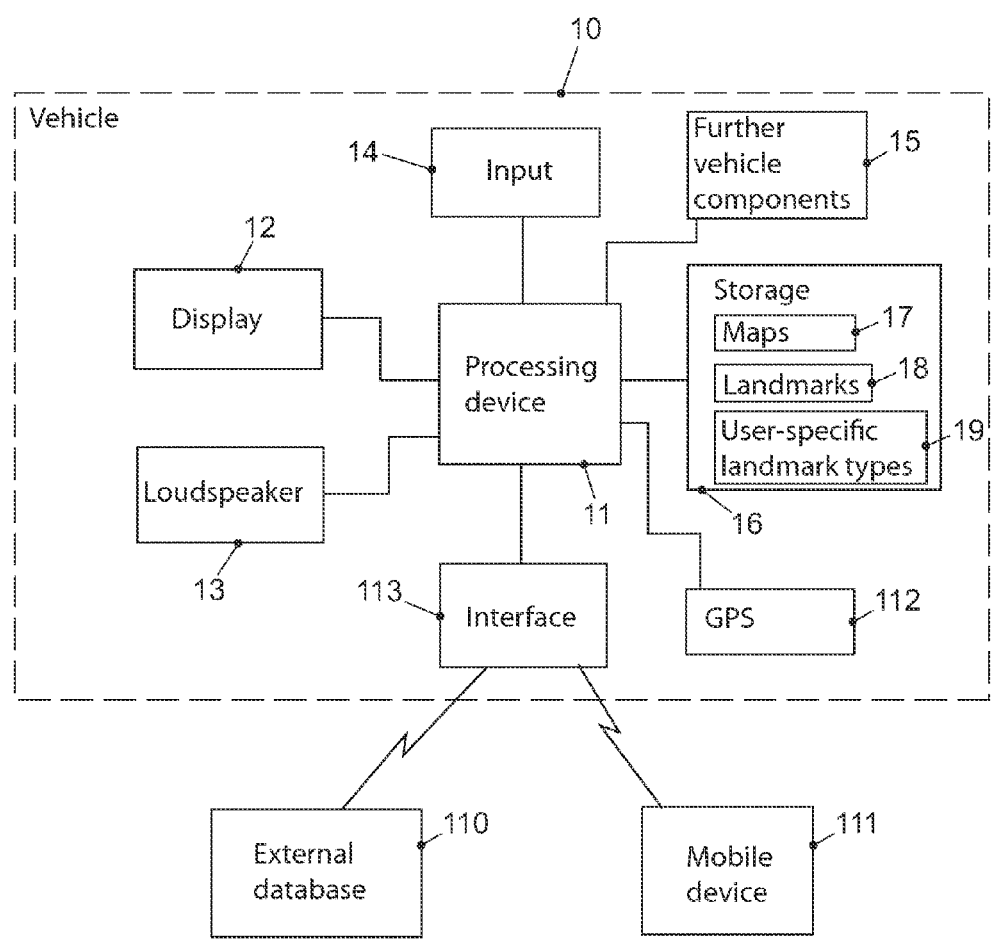
FIG. 1 is a block diagram of a navigation system according to an example embodiment of the present invention.

In FIG. 1, a navigation system according to an example embodiment of the present invention is illustrated. The navigation system illustrated in FIG. 1 is incorporated in a vehicle 10. However, it should be noted that in other example embodiments, a navigation system may be used independently from a vehicle, for example, for pedestrian navigation.

The navigation system of the example embodiment illustrated in FIG. 1 includes a processing device 11, for example, including one or more microprocessors, which controls the navigation system and performs data processing to provide navigation instructions to a user. It should be noted that processing device 11 may be a dedicated processing device used only for the navigation system, but may also be a processing device which is also used for other functions within vehicle 10, for example, for controlling other functions of vehicle 10, such as music reproduction functions. For controlling other functions of the vehicle, processing device 11 may be coupled with further vehicle components 15.

Processing device 11 in the example embodiment shown is coupled with a storage device 16, in which a map database 17, a landmark database 18, and user specific landmark types 19 are stored. It should be noted that map database 17, landmark database 18, and user specific landmark types 19 may be stored in separate databases or other data structures, but may also be stored at least partially in a common database or data structure. Furthermore, storage device 16 may include any kind of storage device, such as a hard disk, solid state memory (RAM and/or ROM), a CD ROM or DVD ROM, a Blu-ray disk, etc.

Furthermore, in the example embodiment shown, processing device 11 is coupled with an interface 113. Via interface 113, which may include a wire-based interface and/or a wireless interface, such as a Bluetooth interface or an interface to a wireless telecommunication system, such as a UMTS system, processing device 11 may couple with an external database 110 which may provide data for map database 17 and/or landmark database 18, for example, points of interest (POIs) to be used as landmarks. Databases providing POIs, often also for advertising purposes, are available on the market. Furthermore, in certain example embodiments, user-specific landmark types 19 may, instead of being stored in storage device 16 or in addition to being stored in storage device 16, also be stored in a mobile device 111, for example, a smartphone of a user, and corresponding data may be accessed via interface 113. It should be noted that for different users, e.g., different drivers of a vehicle, different user-specific landmark types may be stored.

Processing device 11 may furthermore be coupled with a GPS module 112 to determine a position of the navigation system and therefore of vehicle 10. It should be noted that in other example embodiments, also other positioning mechanisms than GPS may be used, for example, Galileo based navigation.

Processing device 11 is furthermore coupled with an input device 14, with a display device 12, and with one or more loudspeakers 13. Via input device 14, a user, for example, a driver of vehicle 10, may input data, for example, a desired destination. In certain example embodiments, additionally the user may also input landmark types to be stored as user-specific landmark types 19. It should be noted that display device 12 may be a touch-sensitive display, for example, a so-called touch screen, and thus also form at least part of input device 14.

Furthermore, on display device 12, processing device 11 may output information regarding the navigation system, for example, menus for operating the navigation system, navigation instructions, or a graphical representation of the surroundings of the vehicle. Navigation instructions, for example, instructions to make a turn (left turn or right turn) may also be output via loudspeakers 13.

In general, as in conventional navigation systems, when receiving an input from a user regarding a desired destination, processing device 11 will calculate a route based on information in map database 17 and output corresponding navigation instructions via display device 12 and/or loudspeaker 13.

As will be explained in more detail below, the navigation system illustrated in FIG. 1 may determine and output navigation instructions using landmarks corresponding to the user-specific landmark types. For example, if a user-specific landmark type is a coffee shop of a specific coffee shop chain, and landmark database 18 indicates that a corresponding coffee shop is present, for example, at an intersection where a turn has to be made, navigation system illustrated in FIG. 1 may output a navigation instruction referring to this landmark, for example, "turn right at coffee shop XXX," coffee shops of type XXX corresponding to a user-specific landmark type. On the other hand, if a coffee shop is identified using landmark database 18, but does not correspond to a user-specific landmark type, in certain example embodiments it is not used for outputting navigation instructions, but instead for example instructions based on distance (e.g. "turn right in 300 meters") and/or navigation instructions based on generic landmark types (e.g. "turn right at next traffic lights") may be used.

As in such an example embodiment, landmark types are used for navigation in particular when they are user-specific landmark types, a user, for example, a driver, can potentially comprehend such instructions easier, as they are based on user-specific landmark types specific to this user, for example, the driver.

Figure 2:
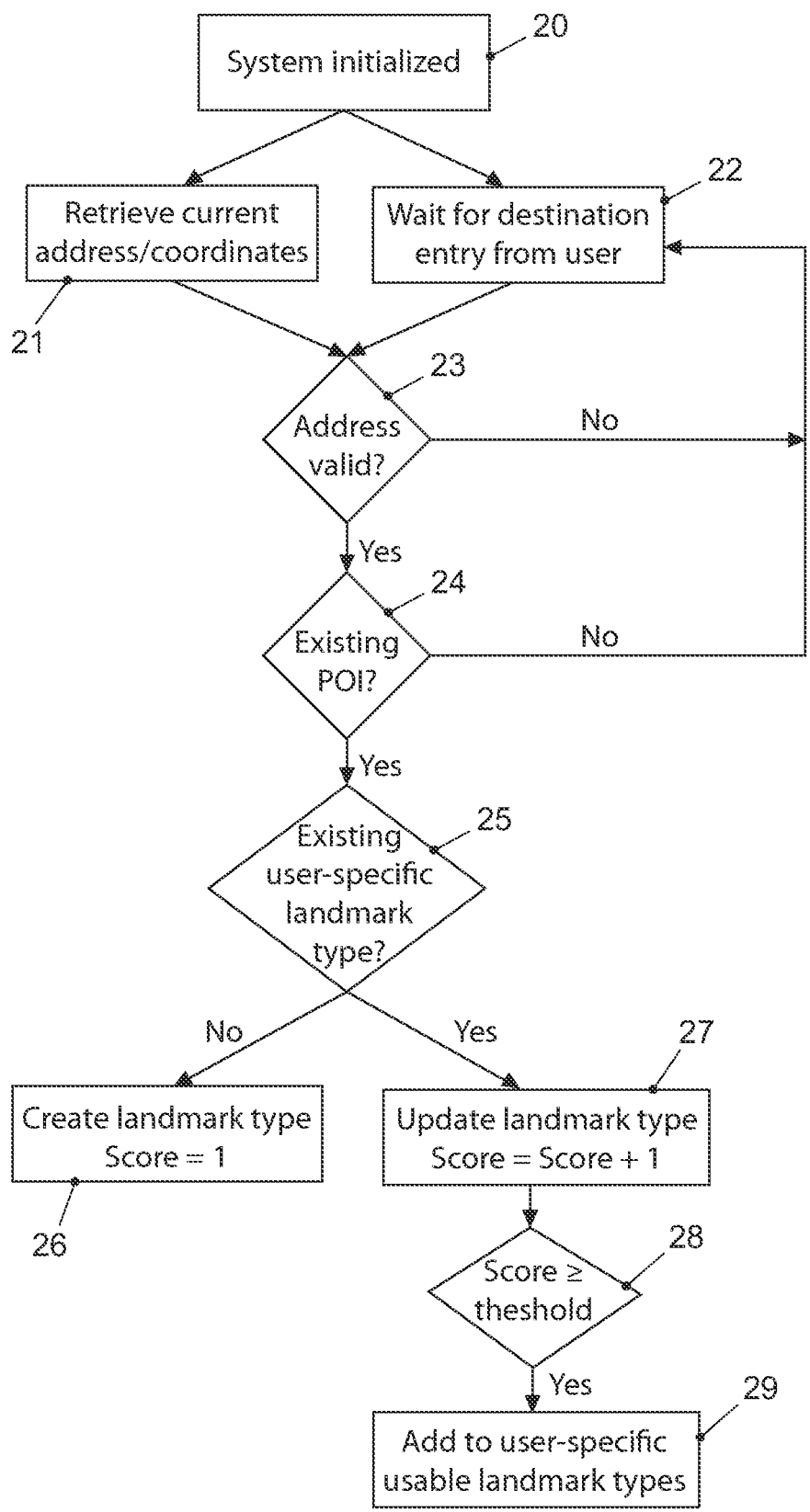
FIG. 2 is a flow chart illustrating a method according to an example embodiment of the present invention.

As mentioned above, user-specific landmark types may also be directly input by a user. In certain example embodiments, additionally or alternatively user-specific landmark types may be determined by the navigation system itself. A corresponding method according to an example embodiment is illustrated in FIG. 2. The method illustrated in FIG. 2 may, for example, be implemented in the system illustrated in FIG. 1, for example, by programming processing device 11 accordingly. The method illustrated in FIG. 2 may, for example, be provided in the form of a computer program on a data carrier which is then executed on processing device 11.

While the method illustrated in FIG. 2 is represented as a series of acts or events, it should be noted that the order of acts or events illustrated is not to be considered as limiting, and, in certain instances, acts or events may be performed in different orders or may be performed simultaneously. Furthermore, certain example embodiments may include other acts or events and/or less acts or events than the ones illustrated in FIG. 2.

At 20, the system is initialized, for example, when the navigation system is started at the beginning of a trip with a correspondingly equipped vehicle. At 21, the current address or coordinates of the navigation system is retrieved, for example, by using a GPS module, such as GPS module 112 illustrated in FIG. 1. Alternatively or additionally, a destination entry from a user may be received at 22, e.g., the system waits until a destination is entered, for example, via input device 14 illustrated in FIG. 1.

At 23, it is checked if the retrieved or input address is a valid address. If this is not the case, the method goes back to 21 and/or 22.

At 24, it is checked if at the determined or input address a point of interest (POI) or other landmark, exists. If this is not the case, the method resumes at 21 and/or 22.

If a POI (or other landmark) exists at the address, at 25 it is checked if the POI matches with an existing user-specific landmark type. For example, if the POI is a coffee shop of a specific chain, it is checked if for coffee shops of this chain a user-specific landmark type exists. If this is not the case, at 26 a landmark type is created with a score of 1. If a user-specific landmark type exists already, the score of this landmark type is increased by 1 at 27. If the score after increasing exceeds a predetermined threshold, for example, a threshold of 5, at 28, the landmark type is then added to the user-specific landmark types usable for navigation, e.g., usable for outputting navigation instructions referring to the landmark type as explained above.

With the method of the example embodiment illustrated in FIG. 2, only after a specific type of landmark, for example, a coffee shop of a specific chain, a gas station of a specific chain (e.g., brand), or a shop or restaurant or other business of a specific chain, has been visited a plurality of times, for example, five times in case the threshold is 5, it is added to the user-specific landmark types which are used for navigation. It should be noted that not only businesses of a chain, but also other businesses (singular businesses) or other landmarks, such as churches, may be used as user-specific landmark types.

It should be noted that in certain example embodiments, the score may decrease again if a specific landmark type has not been visited for a predetermined time period. In certain example embodiments, when the score exceeds the threshold at 28, prior to adding the landmark type to the usable user-specific landmark types, a user is queried if he wants to have this landmark type added to the user-specific landmark types.

In other words, landmark types are first added to a tool of preliminary landmark types, and only if the score exceeds the threshold they are added to the usable user-specific landmark types in the example embodiment illustrated in FIG. 2.

It should be noted that in certain example embodiments, in addition or alternatively to the method illustrated in FIG. 2, and/or in addition or alternatively to directly entering user-specific landmark types by a user, user-specific landmark types may also be determined by a mobile device, for example, a smartphone, such as mobile device 111 illustrated in FIG. 1. For example, mobile device 111 through using a built-in GPS may determine types of businesses a user frequents. This may be also done by a corresponding application on mobile device 111 which tracks user locations in businesses. This information may then be submitted to a navigation system, for example, via interface 113 illustrated in FIG. 1, and businesses frequently related by a user may be classified as user-specific landmark types. Furthermore, it should be noted that in the method illustrated in FIG. 2, in some instances, a parking place may be located some distance from the point of interest a user wants to visit. In this case, if no point of interest or landmark is directly at the address, for example, retrieved at 21, in certain example embodiments, landmarks close to the address or coordinates are determined, and if, for example, a parking happens frequently nearby a particular type of landmark or point of interest, this may be used as a (preliminary) user-specific landmark type.

It should be also noted that the score may continue to be increased after the user-specific landmark types have been classified as usable at 29.

It should be noted that in the example embodiment illustrated, user-specific landmark types are not only specific to the type of business, but also to the company or chain of the business. For example, while a coffee shop of one chain may be a usable user-specific landmark type, a coffee shop of a different chain is not. In this respect, it should be noted that such shops are usually identified by their emblem or logo, such that a user familiar with the emblem or logo of one chain may not be familiar with the logo of a different chain.

Figure 3:
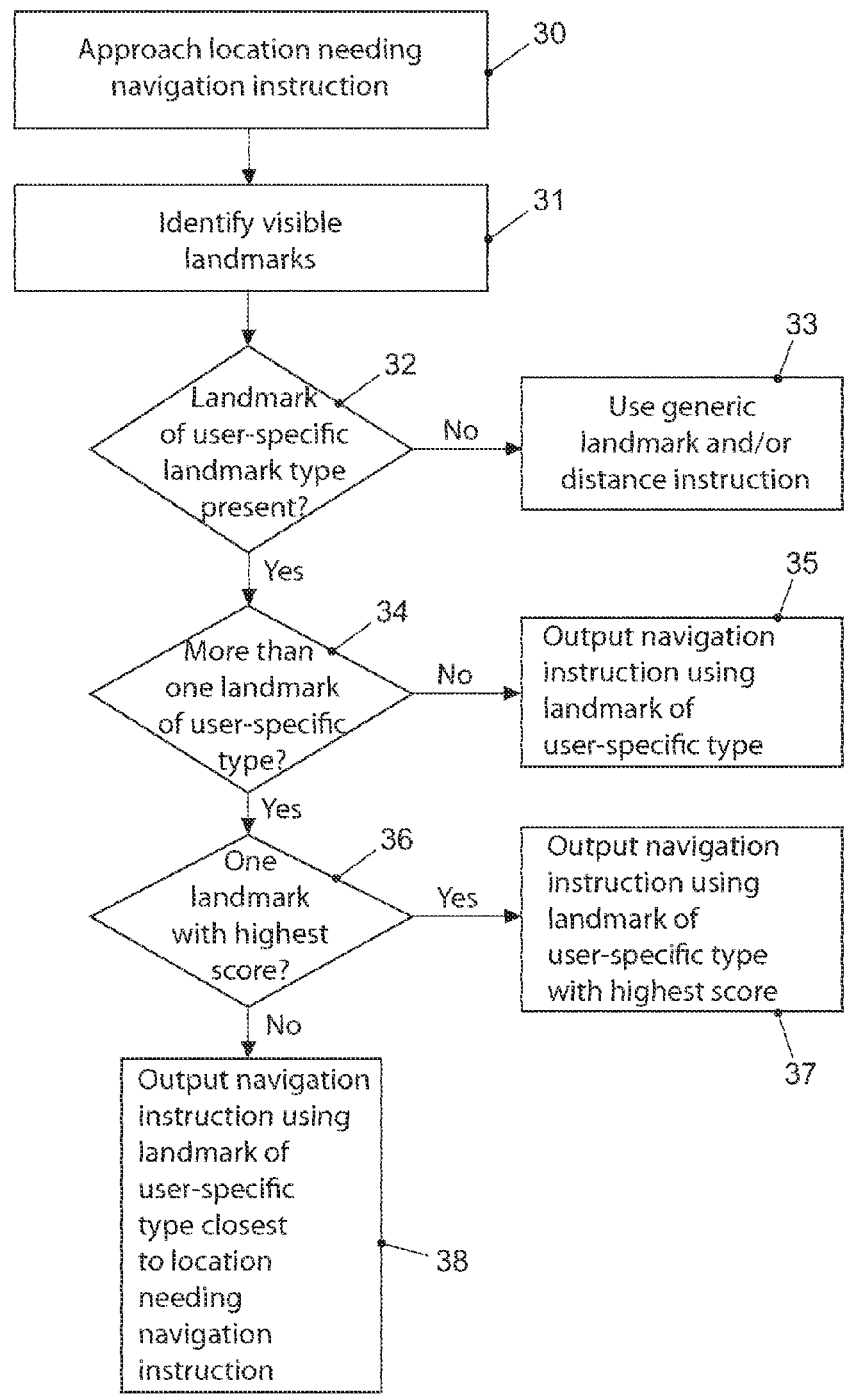
FIG. 3 is a flow chart illustrating a method according to an example embodiment of the present invention.

When at least one user-specific landmark type is usable, for example, determined by the method illustrated in FIG. 2 or directly input by a user, it may be used for navigation instructions. A corresponding method according to an example embodiment is illustrated in FIG. 3. The method of the example embodiment of FIG. 3 may be implemented in the device illustrated in FIG. 1, for example, by programming processing device 11 accordingly, as already explained with respect to the method illustrated in FIG. 2. However, it has to be noted that the application of the example embodiments illustrated in FIGS. 2 and 3 is not limited to the navigation system illustrated in FIG. 1. The method illustrated in FIG. 3 may be implemented in the context of a conventional navigation, e.g., a user inputting a destination and the navigation system calculating a route to the destination and giving corresponding instructions. These instructions are generally given at or near specific locations where a navigation instruction is needed, for example, where, when driving a vehicle, a turn has to be performed, for example, a left turn or a right turn, or where a specific lane should be chosen.

At 30 illustrated in FIG. 3, such a location needing navigation instructions is approached. To give an example for such a situation, in FIG. 4 a situation is shown where a vehicle 41 approaches an intersection 40 where a right turn at a location 42 is to be performed, such that when approaching location 42 navigation instructions should be output instructing the driver of vehicle 41 to perform a right turn.

At 31, visible landmarks, for example, points of interest, are identified, for example, using landmark database 18 illustrated in FIG. 1. In the example illustrated in FIG. 4, for example, a coffee shop 43 and a store 44 are identified. Additionally, as a so-called generic landmark, traffic lights 45 may be identified.

Figure 4:
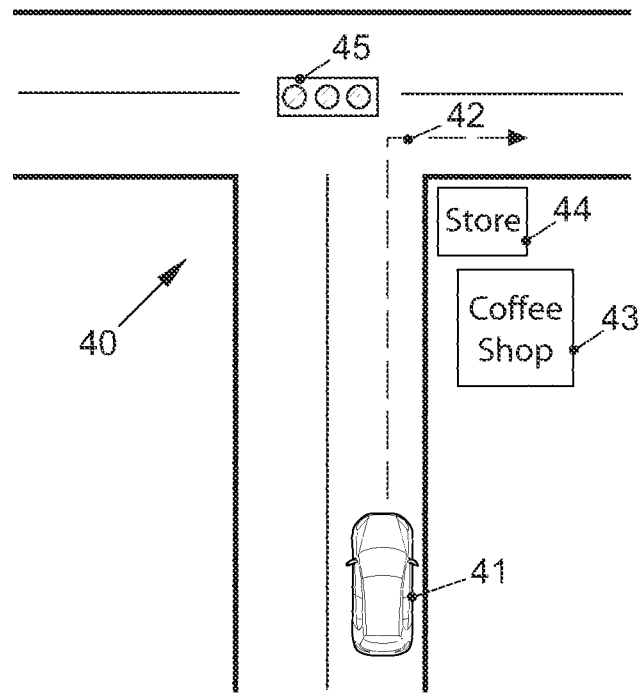
FIGS. 4 and 5 are diagrams for illustrating some features of certain example embodiments of the present invention.

At 32, it is checked if a landmark of a user-specific landmark type is present, e.g., if coffee shop 43 and/or store 44 matches with one of the user-specific landmark types for the particular user, in case of the example illustrated FIG. 4, e.g., the driver of vehicle 41. If this is not the case, at 33 a generic landmark is used (for example, "turn right at traffic lights" for the situation illustrated in FIG. 4), distance instruction is given (for example, "turn right in 100 meters" in FIG. 4), or a combination of the two (for example, "turn right a traffic lights in 100 meters" in FIG. 4).

If one of the identified landmarks matches a user-specific landmark type, at 34 it is checked if there is more than one landmark of user-specific type. In the example illustrated in FIG. 4, for example, only coffee shop 43 may be of a user-specific landmark type, only store 44 may be of a user-specific landmark type, or both coffee shop 43 and store 44 may be of user-specific landmark types.

If this is not the case, e.g., only a single landmark matches with a user-specific landmark type, at 35 navigation instruction is output using the landmark of the user-specific type. For example, for a user where in FIG. 4 coffee shop 43 matches a user-specific type, an instruction may be output "turn right at coffee shop XXX," "coffee shop XXX" denoting the chain or brand of coffee shop. For a different user for which store 44 is of a user-specific landmark type, the instruction may be "turn right at store XXX," "store XXX" again denoting the chain or brand of store 44. Similar to the generic case at 33, also this instruction may be combined with a distance information, for example "turn right at coffee shop XXX in 100 meters" or "turn right at store XXX in 100 meters."

If more than one landmark of user-specific type is identified, at 36 it is checked if one of the landmarks of user-specific type has the highest score. The score may for example be the score as explained with reference to FIG. 2, e.g., representing a number of times a certain landmark type has been visited. In certain example embodiments, additionally or alternatively, the score may be input by a user, such that the user may give a preference which landmarks he prefers for orientation. In certain example embodiments, scores may also be influenced by a central database, for example, businesses with more prominent logos being attributed a higher score than businesses with less prominent logos. It should be noted that while in certain example embodiments, a "higher score" may be represented by a higher number, in other example embodiments also lower numbers may be used to represent higher scores, e.g., higher preferences. Furthermore, in certain example embodiments, scores may be regarded equal if they differ only slightly, e.g., ±1, such that for being regarded as highest score the score must exceed the other scores by a predetermined threshold, e.g., 2.

If one of the landmarks is of a type with the highest score, at 37 navigation instructions are output using the landmark of user-specific type with the highest score. For example, in FIG. 4 if both store 44 and coffee shop 43 are landmarks of user-specific type, but store 44 has the higher score, store 44 is used for the navigation instructions, for example, "turn right at store XXX." As explained with reference to 35, this instruction may be combined with a distance indication in certain example embodiments.

Figure 5:
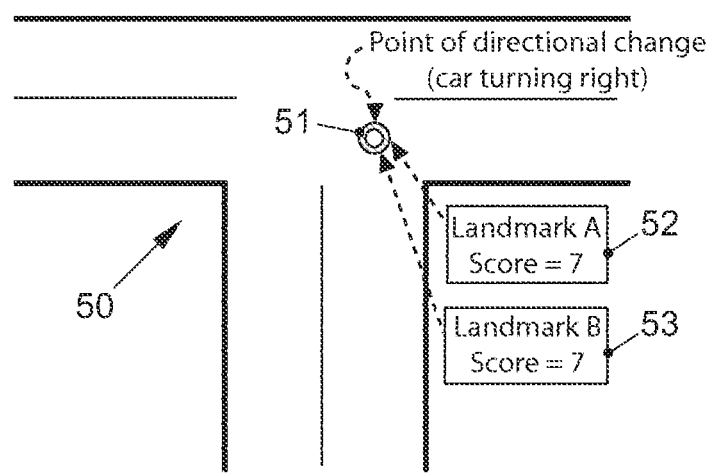

If two or more identified landmarks are of landmark types with the same score, at 38 navigation instructions are output using a landmark of user-specific type which is closest to the location needing navigation instructions, for example, the location of a turn. This is illustrated in FIG. 5, where a vehicle (not shown) approaches an intersection 50 and should turn right at a location 51. In the example illustrated in FIG. 5, two landmarks 52, 53 are identified as being of user-specific type. Both landmarks in the example of FIG. 5 have a score of 7. It should be noted that landmarks 52, 53 may, for example, be store 44 and coffee shop 43 of the example illustrated in FIG. 4.

As in this case landmark 52 is closer to location 51, in the example embodiment illustrated in FIG. 3, landmark 52 would be used for the navigation instruction.

It should be noted that in case more than one landmark of user-specific type is identified, also other criteria for selection than the ones described above with reference to FIG. 3 (e.g., score, proximity to location needing navigation instruction) may be used. For example, the choice may also be random, or other criteria, such as proximity to the street which is related to visibility may be used. In certain example embodiments, also a landmark closer to the navigation system, for example, to the vehicle incorporating the navigation system, may be used as criteria instead of proximity to the location needing navigation instructions.

Also at 38, distance information may be given in addition to the navigation instruction using the landmark of user-specific type, as explained with reference to 35 above.

As can be seen, a plurality of variations and modifications are possible in the example embodiments presented, and therefore these example embodiments are not to be considered as limiting.

What is claimed is:

1. A method, comprising:
providing a map database;
providing a landmark database;
providing at least one landmark type;
responsive to a user selection of one of the landmark types, classifying the selected landmark type as a user-specific landmark type;
attributing a score for each of the landmark types based on a number of times the user has visited a landmark of the landmark type, wherein an increase in the number of times that the user has visited the landmark corresponds to an increase in the score;
for each of the landmark types that reaches a pre-determined threshold score, classifying the landmark type as another user-specific landmark type;
using a global positioning system to determine retrieving a current location of a navigation system; and
using a global positioning system to determine a current location of a navigation system;
retrieving a desired destination of the user;
generating a route to the desired destination based on the retrieved current location and desired destination;
upon approaching a location on the route requiring the user to perform an action, determining navigation instructions for the user at the location based on the map database, the landmark database, and at least one of the user-specific landmark type; and
generating and outputting, to a display, the determined navigation instructions including the at least one user-specific landmark type as a reference point.

2. The method according to claim 1, further comprising classifying a landmark type as a usable user-specific landmark type if a landmark of the user-specific landmark type has been visited by a user at least a predetermined number of times.

3. The method according to claim 1, further comprising determining landmarks a user has visited including receiving a desired destination entry from the user and/or determining the current location at an initial starting of a navigation system.

4. The method according to claim 1, wherein the providing of at least one user-specific landmark type includes receiving the at least one user-specific landmark type from a mobile device.

5. A method, comprising:
providing a map database;
providing a landmark database;
providing at least one landmark type;
responsive to a user selection of one of the landmark types, classifying the selected landmark type as a user-specific landmark type;
attributing a score for each of the landmark types based on a number of times the user has visited a landmark of the landmark type, wherein an increase in the number of times that the user has visited the landmark corresponds to an increase in the score;
for each of the landmark types that reaches a pre-determined threshold score, classifying the landmark type as another user-specific landmark type;
using a global positioning system to determine a current location of a navigation system;
retrieving a desired destination of the user;
generating a route to the desired destination based on the retrieved current location and desired destination;
upon approaching a location on the route requiring the user to perform an action, determining navigation instructions for the user at the location based on the map database, the landmark database, and at least one of the user-specific landmark type; and
generating and outputting, to a display, the determined navigation instructions including the at least one user-specific landmark type as a reference point;
wherein the determining of navigation instructions includes:
identifying at least one landmark in a vicinity of the location requiring the user to perform the action;
checking if one or more landmarks of the at least one landmark match the user-specific landmark type; and
determining the navigation instructions based on the one or more landmarks matching the user-specific landmark type.

6. The method according to claim 5, further comprising:
determining the navigation instructions to contain a generic landmark and/or a distance information if no landmark of the at least one landmark matches a user-specific landmark type.

7. The method according to claim 5, wherein at least two landmarks of the at least one landmark match a user-specific landmark type; and
wherein the determining of navigation instructions includes selecting one landmark of the at least two landmarks based on a predetermined criterion, and determining the navigation instructions using the selected landmark.

8. The method according to claim 7, wherein the criterion is based on distances between the at least two landmarks and the location needing navigation instructions.

9. A navigation system, comprising:
a storage device configured to store a map database and a landmark database;
a processing device configured to:
provide the map database;
provide the landmark database;
provide at least one landmark type;
responsive to a user selection of one of the landmark types, classify the selected landmark type as a user-specific landmark type;
attribute a score for each of the landmark types based on a number of times the user has visited a landmark of the landmark type, wherein an increase in the number of times that the user has visited the landmark corresponds to an increase in the score; for each of the landmark types that reaches a pre-determined threshold score, classify the landmark type as another user-specific landmark type,
use a global positioning system to determine a current location of a navigation system;
retrieve a desired destination of the user;
generate a route to the desired destination based on the retrieved current location and desired destination;
upon approaching a location on the route requiring the user to perform an action, determine the navigation instructions for the user at the location based on the map database, the landmark database, and the at least one user-specific landmark type; and
generate the determined navigation instructions including the at least one user-specific landmark type as a reference point, and
an output device configured to output the determined navigation instructions to a display.

10. A navigation system, comprising:
a storage device configured to store a map database, a landmark database, and at least one landmark type;
a processing device configured to classify a landmark type as a user-specific landmark type in response to a user selection of one of the landmark types, attribute a score for each of the landmark types based on a number of times the user has visited a landmark of the landmark type, wherein an increase in the number of times that the user has visited the landmark corresponds to an increase in the score, and classify the landmark type as another user-specific landmark type for each of the landmark types that reaches a pre-determined threshold score;
the processing device further configured to use a global positioning system to determine a current location of a navigation system, retrieve a desired destination of the user, generate a route to the desired destination based on the retrieved current location and desired destination, determine navigation instructions at a location on the route requiring the user to perform an action as the user approaches the location based on the map database, the landmark database, and at least one of the user-specific landmark type, and generate the determined navigation instructions including the at least one user-specific landmark type as a reference point; and
a display device configured to output the determined navigation instructions, including the at least one user-specific landmark type as the reference point.

11. The navigation system according to claim 10, wherein the map database and the landmark database are stored in the storage device.

12. The navigation system according to claim 10, further comprising an interface configured to receive at least one user-specific landmark type.

13. The navigation system according to claim 10, the processing device further configured to:
    provide the map database;
    provide the landmark database; and
    provide the at least one user-specific landmark type.

\* \* \* \* \*